Patented May 11, 1937

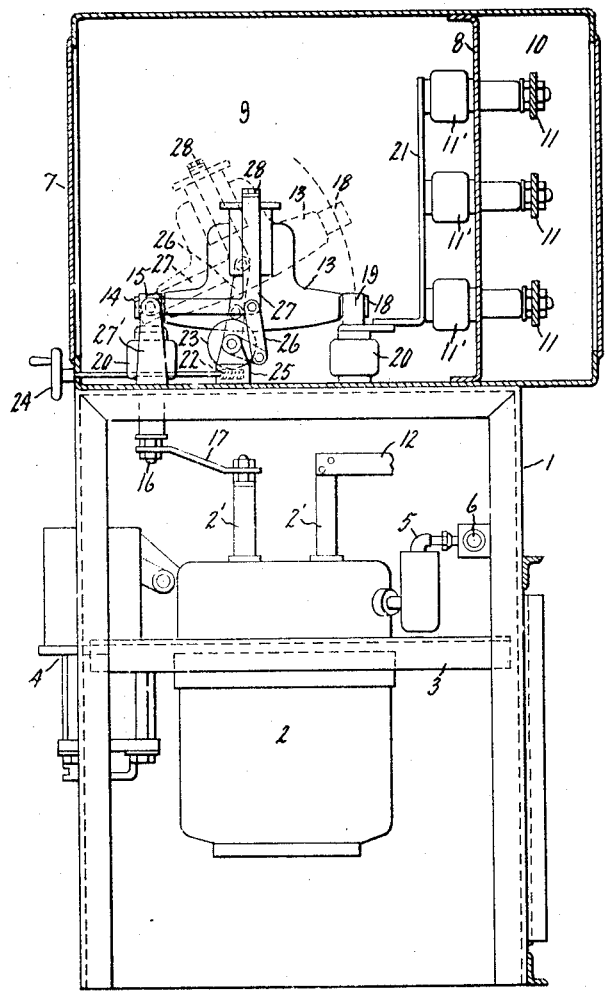

2,080,226

UNITED STATES PATENT OFFICE 2,080,226

ELECTRIC SWITCH GEAR

Robert Paxton, Drexel Hill, Pa., assignor to General Electric Company, a corporation of New York Application January 24, 1936, Serial No. 60,665

7 Claims. (Cl. 175—298)

My invention relates to electric switchgear, more particularly to switchgear of the metal enclosed or indoor type wherein an electric circuit breaker is mounted within a cubicle or equivalent structure and is normally electrically connected to circuit conductors, such as busbars, through disconnect devices.

Generally speaking, in switchgear of the aforesaid type, isolation of the circuit breaker with respect to the busbars is effected either by bodily movement of the circuit breaker, in which case the disconnect device may comprise plug and socket contacts carried by the circuit breaker and stationary structure respectively, or by independently operated disconnect switches in which case the breaker is stationary. Stationary breakers are in many cases very desirable and are often specified. In the latter case the separately actuated disconnect switches, together with the usual associated apparatus, such as current transformers, insulators, electrical joints and connections, etc. have heretofore presented a problem in design, the switchgear generally occupying considerable space, particularly in so far as the super-structure above the breaker is concerned, and requiring an appreciable number of insulating mountings, electrical joints, etc., resulting in increased cost of the apparatus.

The principal object of my invention is the provision of improved electrical switchgear of the aforesaid stationary breaker type which shall be simple and compact in design while maintaining electrical efficiency and adequate insulation, and which is comparatively inexpensive and includes a minimum number of insulators, mountings and electrical connections.

My invention will be more fully set forth in the following description referring to the accompanying drawing, and the features of novelty which characterize my invention will be pointed out with particularity in the claims annexed to and forming a part of this specification.

Referring to the drawing, the single figure thereof is an elevational view, in section, of an electric switchgear unit of the stationary breaker type embodying my invention.

The switchgear unit illustrated comprises a supporting frame 1 composed of angle iron, for example, forming a cubicle-like enclosure within which an oil circuit breaker 2 is mounted. The breaker 2 is suitably supported by transverse members 3 and is provided with operating mechanism 4, such as mechanism of the well-known solenoid operated type. The casing or tank of the circuit breaker 2 is in communication through a venting arrangement 5 with a conduit 6 for venting gases generated within the breaker casing during interruption of a power circuit.

Mounted on the frame 1 is a super-structure 7 comprising a sheet metal housing having a partition 8 for dividing the same into a disconnect and current transformer compartment 9 and a busbar compartment 10. The drawing illustrates three phase busbars 11 although but associated apparatus for a single phase appears in the elevational view. The busbars, which may be connected to a generating source, are normally connected through disconnect apparatus, hereinafter described, to one terminal stud 2' of the circuit breaker 2, the other terminal stud 2' being connected to a branch circuit conductor 12. There generally is a switchgear unit for each branch circuit leading from the busbars, the units being arranged in a row with the busbars in alinement and continuous, as is well known in the art.

For the purpose of radically simplifying the disconnect device and eliminating a number of parts in the compartment 9 heretofore considered essential, the current transformer 13, which was formerly mounted independently of the disconnect device on stationary insulators, is mounted for bodily movement and is provided at its terminals with disconnect contacts so that the current transformer itself virtually constitutes a disconnect device.

To this end one terminal of the current transformer at 14 is pivotally mounted on a bracket 27' with respect to the stationary coacting terminal 15 which is connected to an insulated conductor stud 16 extending through the bottom wall of the compartment 9, and which is connected by conductor 17 to one terminal stud 2' of the circuit breaker. The other terminal of the current transformer at 18 coacts with terminal clip 19 in the manner of a knife blade switch, the terminal 19, as in the case of terminal 15, being mounted on an insulating support 20 at the bottom wall of the compartment and electrically connected by conductor 21 to the upper busbar 11. The remaining busbars are similarly connected to the associated phase disconnect apparatus (not shown). Obviously, the current transformer may be pivotally connected to the terminal 19 and move with respect to the terminal 15 if desired.

In the usual polyphase arrangement involving a plurality of current transformers, the yoke 27 interconnects and is common to the transformers for uniform operation and is pivotally supported at opposite sides thereof by brackets 27'. The terminals 15 are supported by insulating supports 20 which likewise serve as bushings for the conductor studs 16 and are positioned between the brackets 27'.

It will be noted that the insulating supports 20 for the current transformer and the insulating supports and bushings at 11' for the individual busbar connections constitute substantially the sole apparatus for insulating and mounting the current transformer, disconnect equipment and associated conductors. In view of the fact that a metallic barrier, such as the partition 8, generally separates the current transformer and busbar compartments, it will be apparent that the apparatus is mounted and insulated in the simplest possible manner and with a minimum number of parts.

The means for operating the disconnect device may comprise any suitable arrangement, the one illustrated comprising a worm and gear 22, 23 operated by the hand crank 24 exteriorly of the compartment. The gear 23 which is mounted on the supporting bracket 25 is connected to the current transformer through a toggle linkage 26 which is in turn connected to a yoke or the like 27, in turn pivotally supported on an insulator 20 and secured to the current transformer at 28. When the handwheel 24 is rotated so as to cause straightening of the toggle 26, the combined current transformer and disconnect device is rotated about the terminal 15 to the isolating position shown in dotted lines, in which position the circuit breaker 2 and branch circuit 12 are isolated with respect to the busbars. In this position the current transformers can be easily and safely removed for inspection or repair or for replacement.

The operating arrangement for the disconnect device may, if desired, move or elevate the current transformer bodily so that both terminals of the current transformer are out of contact with the associated stationary terminals in the isolating position. Such an arrangement would have particular application where the metal clad unit is used either as a feeder or an incoming line unit and would insure that the current transformer be dead in the isolating position.

In practice, suitable interlocking means is provided for insuring opening of the circuit breaker prior to opening of the disconnect device. However, in the interest of clearness, an interlocking arrangement is omitted since it is unnecessary for a clear understanding of the present invention.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States is:

1. Electric switchgear comprising a circuit breaker, circuit conductors with respect to which said circuit breaker is normally connected, a current transformer connected in circuit between said circuit breaker and conductors, and a disconnecting device for isolating said circuit breaker with respect to said conductors including disconnect contacts connected to the terminals of said current transformer, said current transformer and said disconnect contacts constituting a movable unit, and means for bodily moving said unit to connected and disconnected positions independently of said circuit breaker.

2. An electric switchgear unit of the metal enclosed type comprising a stationary circuit breaker, a busbar and a current transformer, means for isolating said circuit breaker with respect to said busbar including disconnect contacts connected to the opposite terminals of said current transformer, stationary disconnect contacts coacting with the aforesaid contacts, and means for bodily moving said current transformer for opening and closing the circuit between said breaker and busbar independently of said breaker.

3. An electric switchgear unit comprising a stationary circuit breaker, a current transformer mounted for pivotal movement, busbars, a pair of fixed disconnect contacts electrically connected respectively to one terminal of said circuit breaker and a corresponding busbar, one terminal of said current transformer being at the pivotal mounting thereof and electrically connected to one of said fixed contacts, and a disconnect contact connected to the other terminal of said current transformer movable through an arc in accordance with pivotal movement of said transformer with respect to said other fixed contact.

4. An electric switchgear unit of the metal enclosed type comprising a stationary circuit breaker, associated phase current transformers and busbars, each current transformer having disconnect contacts at the opposite terminals thereof, a pair of coacting fixed disconnect contacts, said fixed contacts electrically connected to one terminal of said breaker and a corresponding phase busbar respectively, and means for rotating said current transformer about one of said fixed contacts for opening the circuit at the other fixed contact.

5. An electric switchgear unit comprising a supporting frame, a stationary circuit breaker mounted in said frame, a sheet metal housing forming a super-structure on said frame, a metallic partition vertically positioned forming two compartments in said housing, phase busbars mounted in one of said compartments, phase current transformers mounted in the other of said compartments, the opposite terminals of each of said current transformers including disconnect contacts normally in horizontal alinement, coacting fixed disconnect contacts mounted in horizontal alinement and insulated with respect to the lower wall of the current transformer compartment, one of said fixed contacts being electrically connected through an insulating bushing in the lower wall of said compartment to one terminal of said circuit breaker, the other of said fixed contacts being electrically connected through an insulating bushing in said partition to a corresponding busbar, and means for rotating said current transformer about one of said fixed contacts so that the circuit between said busbar and the circuit breaker is opened at the other of said fixed contacts.

6. Electric switchgear including a power circuit and a current transformer normally connected in a portion of said circuit, disconnecting means for isolating said portion of said circuit comprising relatively movable disconnect contacts, the movable disconnect contacts being carried by said current transformer and electrically connected to the terminals thereof, and means for moving said current transformer for effecting the isolating operation.

7. Electric switchgear including a power circuit and a current transformer normally connected in a portion of said circuit, a supporting structure for said current transformer, insulating bushings for mounting and insulating said current transformer with respect to said structure, fixed disconnect contacts carried by said bushings, coacting disconnect contacts carried by said current transformer, and means for bodily moving said current transformer for effecting a disconnecting operation.

ROBERT PAXTON.